(12) United States Patent
Karman et al.

(10) Patent No.: US 7,619,604 B2
(45) Date of Patent: Nov. 17, 2009

(54) SWITCHABLE 2D/3D DISPLAY

(75) Inventors: Gerardus P. Karman, 'S-Hertogenbosch (NL); Marcellinus P. C. M. Krijn, Eindhoven (NL); Volker Schoellmann, Dusseldorf (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 590 days.

(21) Appl. No.: 10/566,548

(22) PCT Filed: Jul. 22, 2004

(86) PCT No.: PCT/IB2004/002592

§ 371 (c)(1),
(2), (4) Date: Jan. 27, 2006

(87) PCT Pub. No.: WO2005/011293

PCT Pub. Date: Feb. 3, 2005

(65) Prior Publication Data

US 2006/0187179 A1    Aug. 24, 2006

(30) Foreign Application Priority Data

Jul. 31, 2003    (GB) .................................. 0317909.0

(51) Int. Cl.
*G09G 3/36* (2006.01)

(52) U.S. Cl. ..................................... 345/102

(58) Field of Classification Search .................. 345/102, 345/419, 695; 349/61; 362/612
See application file for complete search history.

(56) References Cited

U.S. PATENT DOCUMENTS

| 4,717,949 | A | 1/1988 | Eichenlaub |
| 5,349,379 | A * | 9/1994 | Eichenlaub .................. 348/59 |
| 6,172,807 | B1 | 1/2001 | Akamatsu |
| 6,215,590 | B1 | 4/2001 | Okano |
| 6,304,288 | B1 | 10/2001 | Hamagishi |
| 6,504,589 | B1 * | 1/2003 | Kashima et al. ............... 349/96 |
| 2003/0058209 | A1 * | 3/2003 | Balogh ......................... 345/87 |
| 2004/0004594 | A1 * | 1/2004 | Kato et al. .................... 345/87 |

FOREIGN PATENT DOCUMENTS

| EP | 1248473 A1 | 10/2002 |
| GB | 2296400 A | 6/1996 |
| GB | 2364157 A | 1/2002 |

* cited by examiner

Primary Examiner—Amare Mengistu
Assistant Examiner—Liliana Cerullo

(57) ABSTRACT

A display device comprises a backlight (6) and a light modulating layer (5) such as an LCD device. The backlight (6) can be controlled to operate as a single homogenous light source for producing 2D images or a series of narrow parallel light sources for producing 3D images. Preferably, the backlight (6) is an OLED device and the 2D/3D mode switching is achieved by selectively energising all or a subset of parallel control electrodes (11) of the OLED device.

15 Claims, 6 Drawing Sheets

SWITCHABLE 2D/3D DISPLAY

The present invention relates to a display device.

Liquid crystal display devices, in which a backlight is modulated on a pixel-by-pixel basis using a liquid crystal matrix, are well-known. Such devices generally produce a two-dimensional (2D) image. Three dimensional (3D) images can be produced but additional components are required. For example, an array of semi-cylindrical lenses can be placed in front of the liquid crystal device. Alternatively, in a parallel barrier technique, a barrier layer comprising an opaque sheet with a pattern of transparent lines is placed between the backlight and the liquid crystal matrix. A further technique, disclosed in U.S. Pat. No. 4,717,949, uses thin parallel light sources behind a liquid crystal matrix.

These known techniques suffer from the problem that a display must be constructed as either a 2D display or a 3D display.

It is an object of the present invention to provide a display device that can be used to provide both 2D and 3D images.

According to the present invention, there is provided a display device comprising a light source and an array of light intensity modulators for modulating light from the light source, wherein the light source is configured for operation as a single broad light source or a plurality of narrow light sources, spaced in a spacing direction, and the light source and the array are arranged such that each modulator is significantly illuminated by only one of said narrow sources and a string of modulators, parallel to said spacing direction, is illuminated by each narrow light source.

Thus, a 2D image can be provided by energising the whole light source and a 3D image can be provided by selectively energising just the narrow light sources.

The aforementioned arrangement of modulators and light sources need not occupy the whole image-forming extent of the display device.

The separation of the light sources in U.S. Pat. No. 4,717,949 makes the device disclosed therein unsuitable for operating as a broad light source.

The narrow light sources could be point sources. However, it is preferred that the narrow light sources be elongate and aligned substantially perpendicular to the spacing direction as this simplifies manufacture.

Preferably, the light source has a light emitting face which is substantially coextensive with and plane parallel to the array, which may be an array of pixels of a liquid crystal display.

Preferably, the light source comprises a light emitting diode structure, e.g. an organic light emitting diode structure. More preferably, the light source comprises alternating thick and thin parallel control electrodes which are themselves independently controllable. Alternatively, the light source may comprise thin, side-by-side, parallel, independently controllable control electrodes. This enables the portion of the organic light emitting diode structure used in 3D mode to be changed and thereby extend the useful life of the display as a whole.

By arranging the control electrodes in a two-dimensional grid, it is possible to mix 2D and 3D images in a substantially arbitrary manner.

Where the pixels are arranged in a rectangular grid, unwanted artefacts, such as banding, can be reduced or eliminated by the control electrodes being skewed by an angle ($\theta$), preferably but not essentially 10° or less, relative to the pixel columns.

A colour image can be produced by a device in which the light source comprises a two-dimensional array of regions. These regions may emit different coloured light and, are preferably arranged in a repeating pattern, for the production of colour images. Also, the intensity of the light emitted from these regions may be varied independently in dependence on the local intensity of the image being displayed. Thus, parts of the image that are dim are backlit with low intensity light and parts of the image that are bright are backlit with high intensity light.

Optimal 3D performance is obtained when the length of each of said strings is substantially the same as the spacing between its illuminating narrow source and a neighbouring narrow source thereof.

A display according to the present invention may be employed in electronic apparatuses, including personal digital organisers, computers, mobile phones and the like.

Embodiments of the present invention will now be described, by way of example, with reference to the accompanying drawings, in which.

Figure 1:
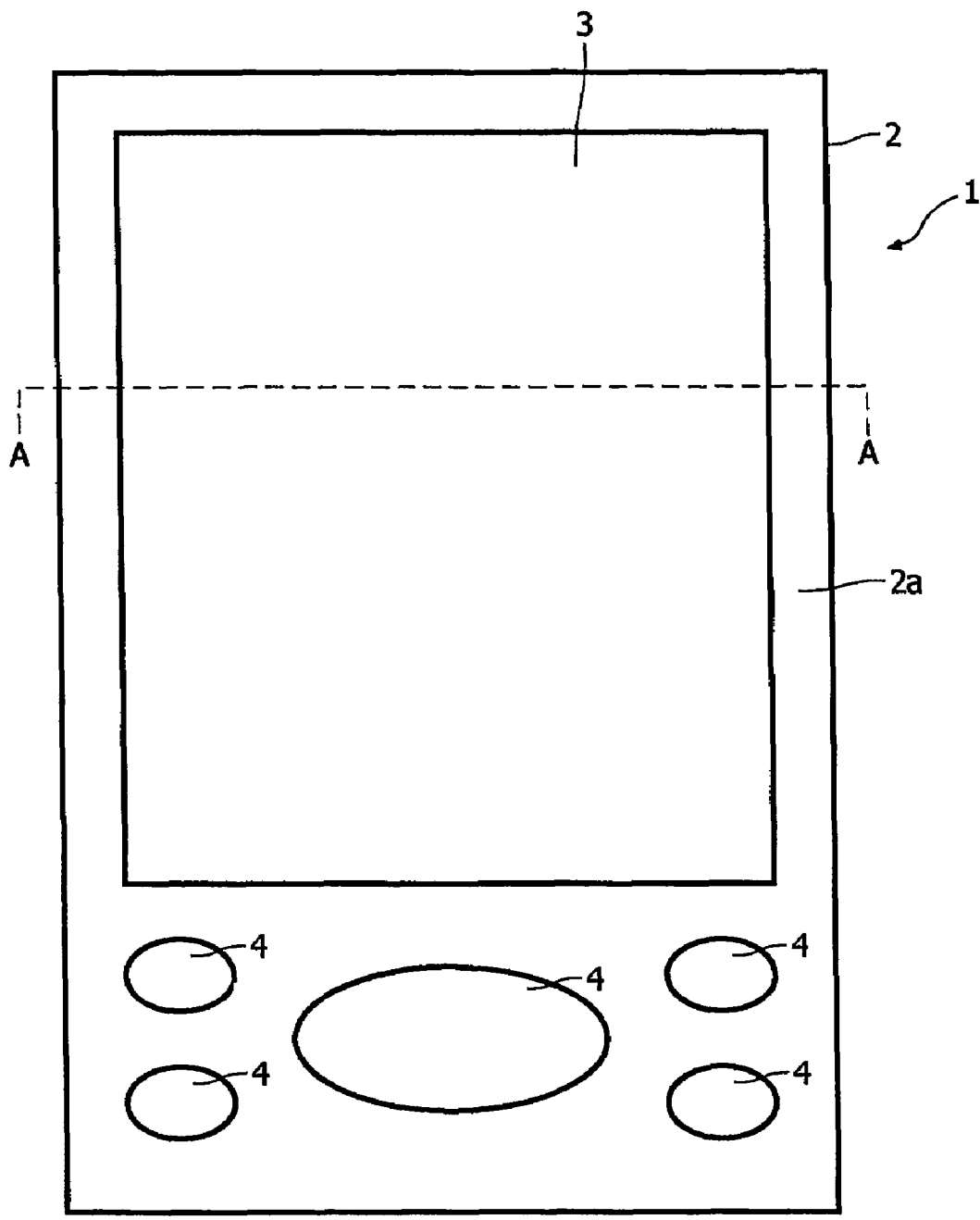
FIG. 1 shows a personal digital assistant including a display according to the present invention.

Referring to FIG. 1, a personal digital assistant (PDA) 1 comprises a flat cuboid body 2. A rectangular display panel 3 and keys 4 are mounted in one of the major faces 2a of the body 2. The keys 4 enable a user to interact with programs running on the PDA 1. The display panel 3 display images generated by programs running on the PDA 1.

Figure 2:
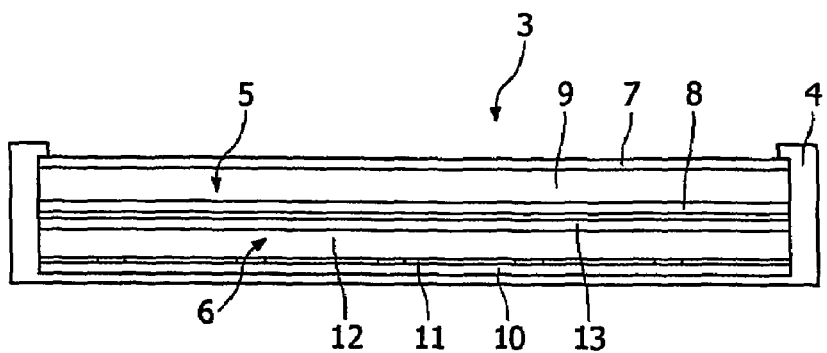
FIG. 2 is a schematic cross-sectional view, along the line AA, of a first embodiment of the display panel for a personal digital assistant as shown in FIG. 1.

Referring to FIG. 2, the display panel 3 comprises a frame 4 which contains a liquid crystal display (LCD) 5 overlying a planar organic light emitting diode (OLED) backlight 6. The display panel 3 can be operated in 2D and 3D modes.

The LCD 5 is conventional and comprises upper and lower electrode-bearing glass sheets 7, 8 separated by a liquid crystal material 9. The pixel pitch of the LCD 5 in this example is 100 μm. The OLED backlight 6 is also generally conventional and comprises at least a substrate 10, a lower electrode layer 11, printed polymer layers 12 and an upper electrode layer 13. The printed polymer layers 12 produce white light. The OLED backlight 6 is unconventional in that the lower electrode layer 10 is divided into thick 11a and thin 11b electrodes (shown exaggerated in FIG. 2 for clarity). The width of each thick electrode 11a is the width of four pixels of the LCD 5 and the width of each thin electrode 11b is the width of one pixel of the LCD 5, allowing for the necessary separation of the electrodes 11a, 11b. A two-pixel wide electrode 11c is formed at the left hand side of the OLED backlight 6. This electrode 11c is a truncated wide electrode and hereinafter is included in the scope of the term "wide electrodes".

Figure 3:
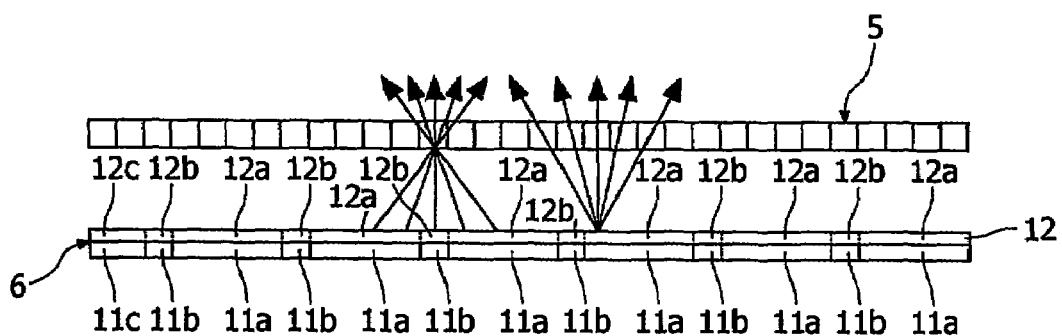
FIG. 3 illustrates the operation of the display panel of FIG. 2 in 2D mode.

Referring to FIG. 3, when the display panel 3 is being operated in 2D mode, all of the electrodes 11a, 11b, 11c of the OLED backlight 6 are energised and the overlying regions 12a, 12b, 12c of the polymer layers 12 emit light. The dimensions of the present example are such that each pixel of the LCD 5 is illuminated by light from an approximately 5-pixel wide strip of the polymer layers 12. Correspondingly, any one-pixel wide stripe of the polymer layers 12, parallel to the electrodes 11a, 11b, 11c, will contribute to the illumination of a five-pixel wide portion of the LCD 5.

Figure 4:
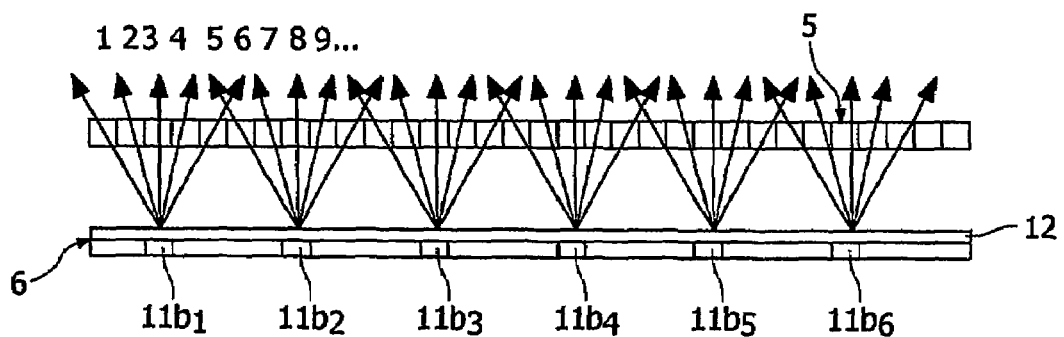
FIG. 4 illustrates the operation of the display panel of FIG. 2 in 3D mode.

Referring to FIG. 4, when the display panel 3 is being operated in 3D mode, only the thin electrodes 11b are energised and only the polymer layer strips 12b overlying these emit light. Consequently, pixel lines 1 to 5 of the LCD 5 are illuminated by the strip of the polymer layers 12 overlying the first thin stripe $11b_1$, pixel lines 5 to 10 are illuminated by the strip of the polymer layers 12 overlying the second thin stripe $11b_2$ and so on.

A first image is formed by pixel lines 1, 6, 11, 16, 21, 26. A second image is formed by pixel lines 2, 7, 12, 17, 22, 27. A third image is formed by pixel lines 3, 8, 13, 18, 23, 28. A fourth image is formed by pixel lines 4, 9, 14, 19, 24, 29. A fifth image is formed by pixel lines 5, 10, 15, 20, 25, 30. The five images are of the same scene from slightly different perspectives, i.e. different viewing angles. Consequently, the viewer perceives a 3D image.

The embodiment of the display panel 3 shown in FIGS. 3 and 4 produces monochrome images. A second embodiment of the display panel 3 is capable of producing colour images.

Figure 5:
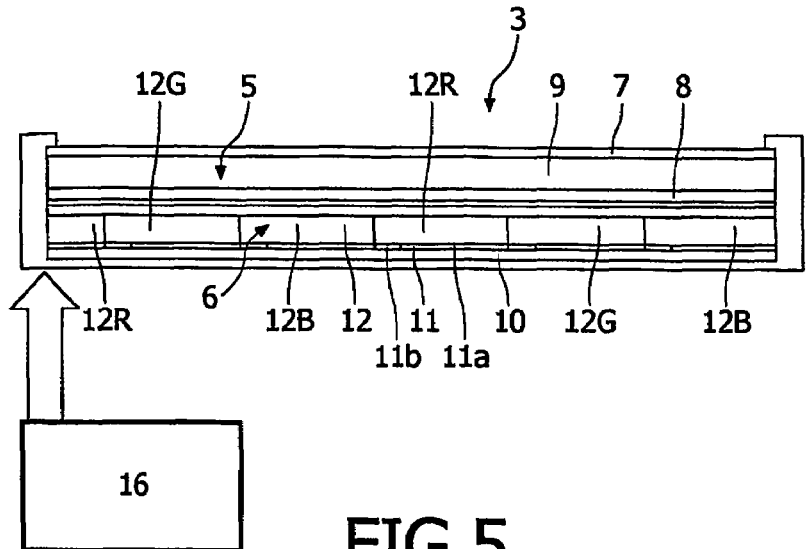
FIG. 5 is a schematic cross-sectional view, along the line AA, of a second embodiment of a display panel for a personal digital assistant as shown in FIG. 1.

Referring to FIG. 5, the second embodiment of the display panel 3 is substantially the same as the first embodiment, described above. However, the polymer layers 12 are divided into stripes which emit either red 12R, green 12G or blue light 12B. With the exception of the leftmost stripe, each polymer layer stripe 12R, 12G, 12B overlays a thick electrode 11a and a neighbouring thin electrode 11b. The energising of the electrodes 11a, 11b is controlled by a control circuit 16 in dependence on data representing the image to be displayed.

In the foregoing embodiments, the lower electrodes 11a, 11b, 11c of the OLED backlight 6 extend unbroken along the full height of the display panel 3. In a third embodiment of the display panel 3 the lower electrodes 11a, 11b, 11c are divided transversely.

Figure 6:
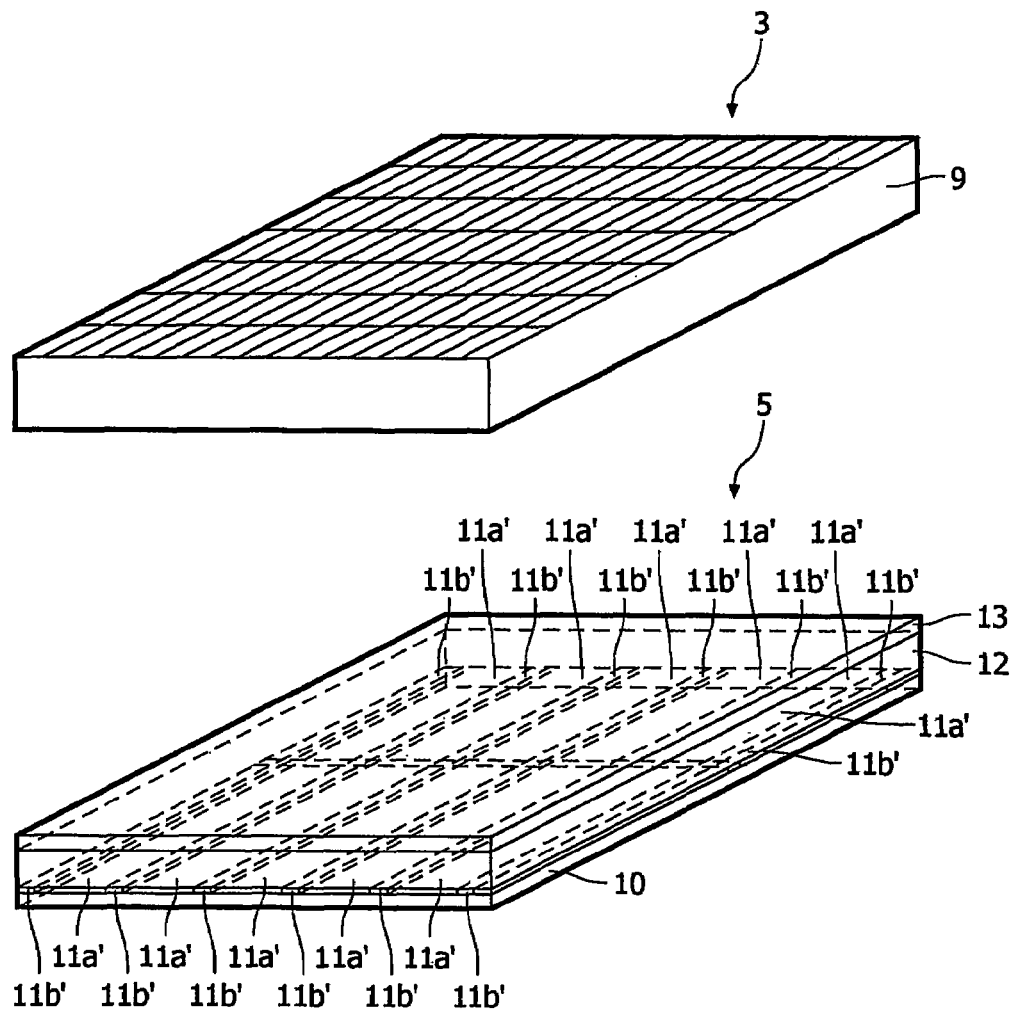
FIG. 6 is a partial schematic perspective view of a third embodiment of a display panel for a personal digital assistant as shown in FIG. 1.
Figure 7:
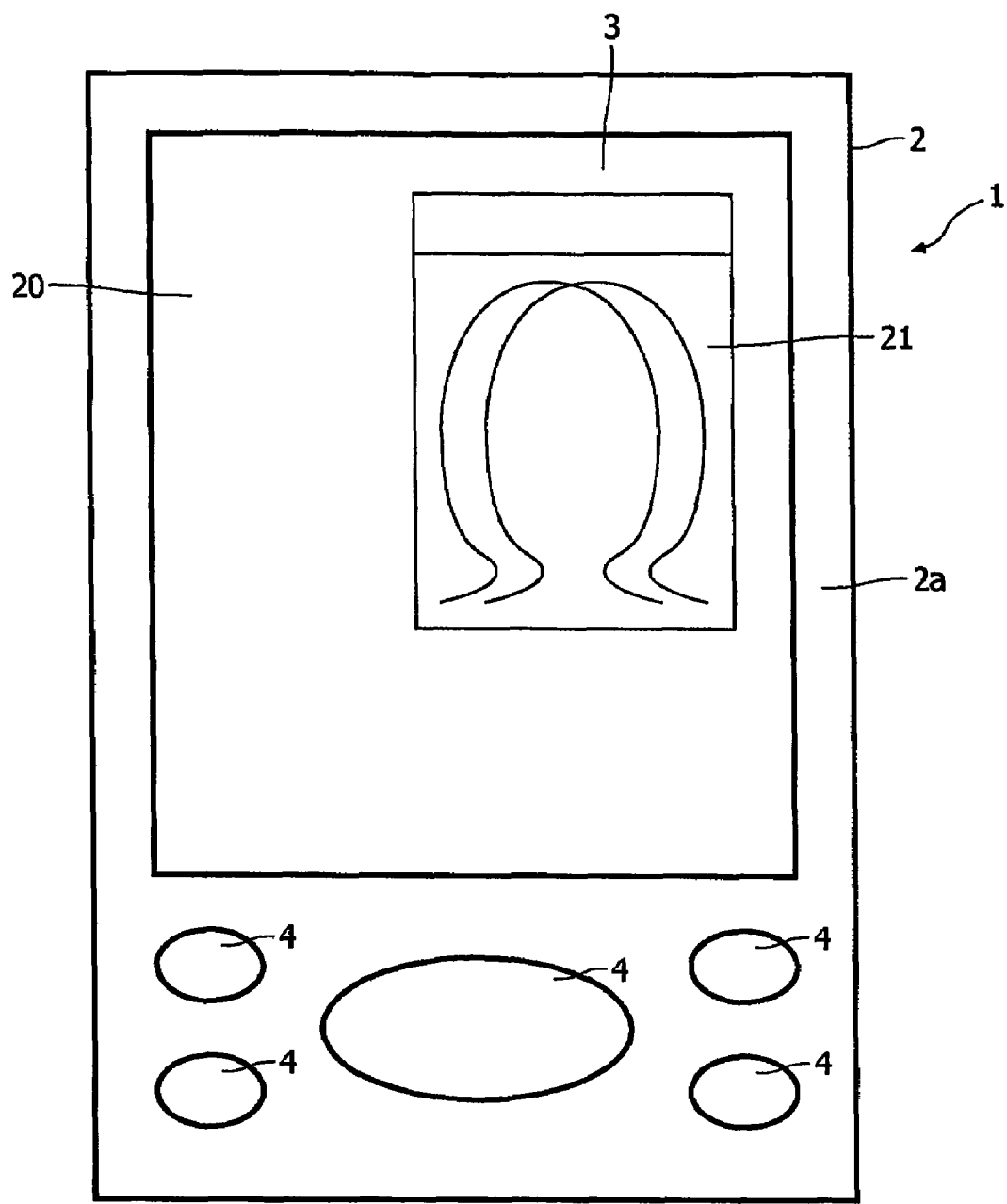
FIG. 7 shows the personal digital organiser of FIG. 1 with the display panel of FIG. 6.

Referring to FIG. 6, the third embodiment of the display panel 3 is substantially the same as the first embodiment described above. However, each of the lower electrodes 11a, 11b is divided transversely into a large number of sections such as 11a' and 11b'. Each electrode section 11a' and 11b' can be energised independently by the control circuit 16. Consequently, as shown in FIG. 7, 2D regions 20, in which both the thick and thin electrodes 11a' and 11b' are energised, can be mixed with 3D regions 21, in which only the thin electrodes 11b' are energised.

With the light source divided into a two-dimensional array of individually controllable regions, it is possible for the control circuit 16 control the brightness of these regions by varying the voltages applied across them to improve the dynamic range of the display. Thus, in dim areas of an image the intensity of the backlight controlled to be low and in bright areas of an image the intensity of the backlight controlled to be high. This advantage is not only available with colour displays and can be achieved in monochrome displays by dividing the backlight into a two-dimensional array of regions that all emit the same colour light.

All of the foregoing embodiments sacrifice resolution on one axis to provide a 3D image. A fourth embodiment solves this problem.

Figure 8:
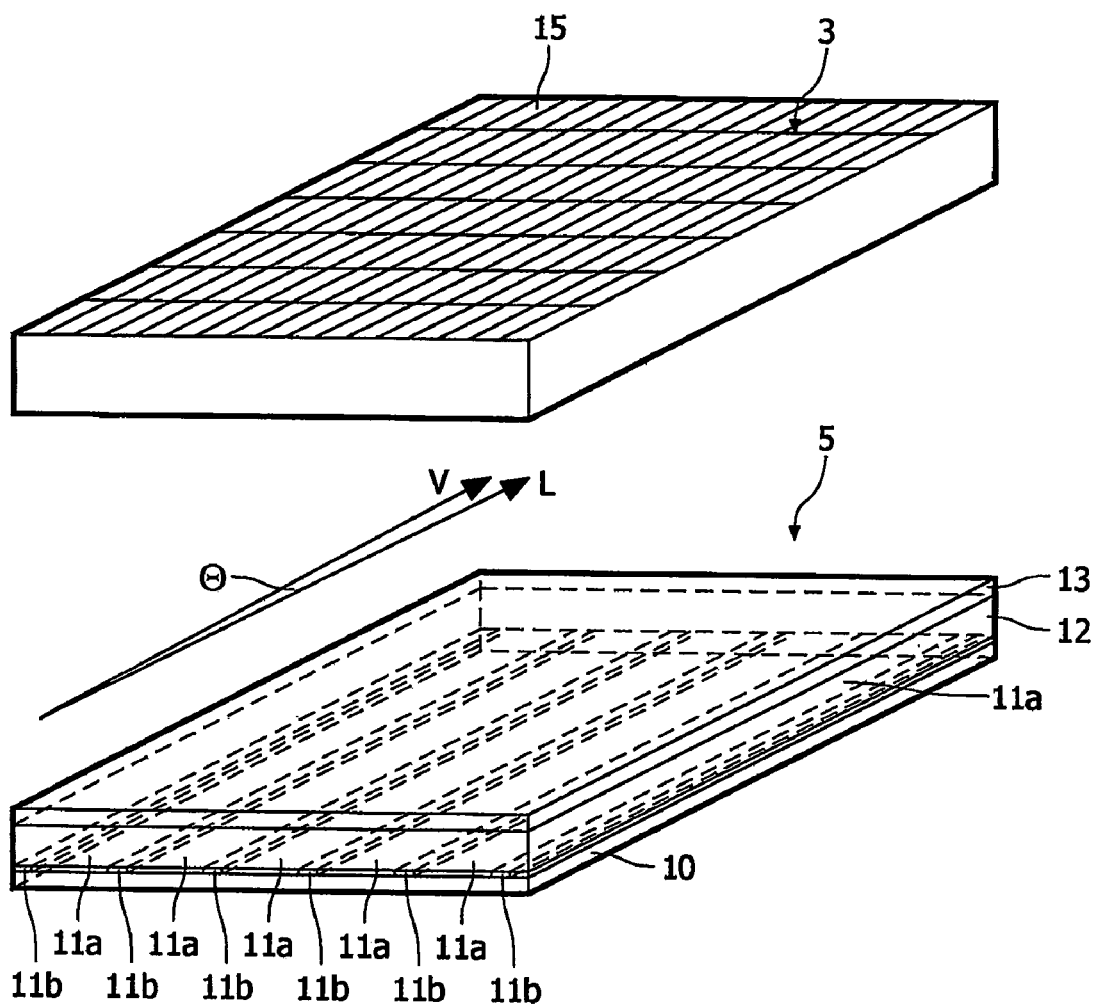
FIG. 8 is a partial schematic perspective view of a fourth embodiment of a display panel for a personal digital assistant as shown in FIG. 1.

Referring to FIG. 8, the longitudinal axes L of thick and thin lower electrodes 11a, 11b are skewed by a small angle ($\theta$) relative to the vertical axis V of the LCD's pixel array. Since the thin electrodes 11b extend under a plurality of columns of pixels 15, perceptible vertical dark bands are avoided when the display is operating in 3D mode.

In a fifth embodiment, the light source 6 comprises narrow light sources only.

Figure 9:
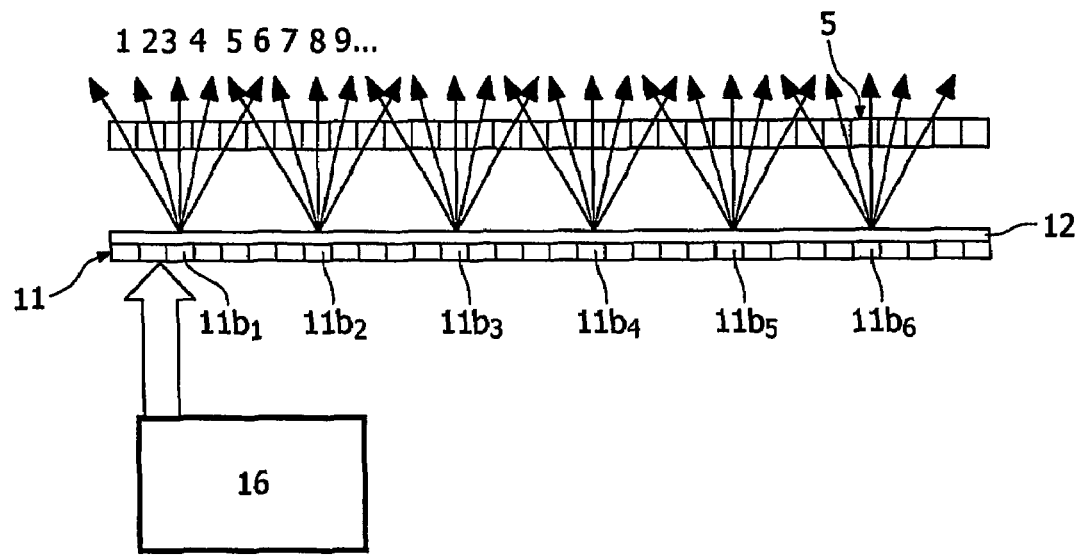
FIG. 9 illustrates the operation of a fifth embodiment of a display panel for a personal digital organiser on a first occasion.

Referring to FIG. 9, the lower electrode layer 11 comprises an array of parallel narrow electrodes. When the display device 3 is operating in 2D mode, all of the electrodes are energised to produce a broad, homogenous backlight.

Figure 10:
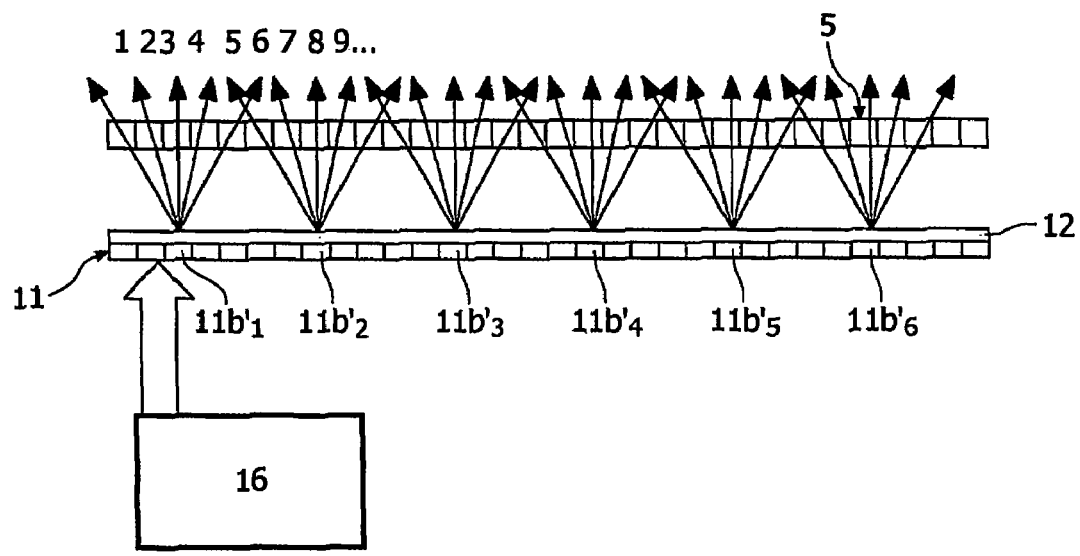
FIG. 10 illustrates the operation of the display panel of FIG. 9 on a second later occasion.

When the display device 3 is operated in 3D mode on a first occasion, a control circuit 16 energises a first set of electrodes $11b'_{1\ldots 6}$. Subsequently, when the display device 3 is operated in 3D mode on a second occasion, the control circuit 16 energises a second set of electrodes $11b'_{1\ldots 6}$ (FIG. 10). In the present example, where each narrow light source illuminates a five-pixel wide portion of the LCD 5, five sets of electrodes are cyclically energised for successive 3D mode operations. The advantage of this mode of operation is that the lifetime of the display is extended since the burden of forming the narrow light sources is spread across the full extent of the polymer layers 12.

It will be appreciated that there are many further embodiments of the present invention. For instance, the separate regions in the third embodiment could contain polymer layers adapted for emitting variously red, green and blue light. Also, the skewed electrode orientation of the fourth embodiment could be applied to the second, third and fifth embodiments. The ratio of the widths of the thin and thick strips of the light source can differ from the examples given above. The ratios between these widths and the pixel pitch of the overlying modulator array can also differ from the examples given above.

The invention claimed is:

1. A display device comprising:
    a light source (6) comprising thin, substantially parallel, independently controllable control electrodes, wherein the light source (6) is configured for operation as a single broad light source or a plurality of narrow light sources, spaced in a spacing direction; and
    an array (5) of light intensity modulators (15) for modulating light from the light source (6), wherein the light source (6) and the array (5) of light intensity modulators are arranged such that each modulator (15) is significantly illuminated by only one of said narrow sources; and a string of said modulators (15), which are parallel to said spacing direction, are illuminated by a corresponding one of said narrow light sources, wherein said control electrodes are skewed relative to a corresponding one of said string of said light intensity modulators such that said control electrodes extend under a plurality of said light intensity modulators.

2. A display device according to claim 1, wherein the narrow light sources are elongate and aligned substantially perpendicular to the spacing direction.

3. A display device according to claim 1, wherein the light source (6) has a light emitting face which is substantially coextensive with a plane parallel to the array (5).

4. A display device according to claim 1, wherein the array (5) comprises an array of pixels (15) of a liquid crystal display (5).

5. A display device according to claim 1, wherein the light source (6) comprises an organic light emitting diode structure.

6. A display device according to claim 1, wherein the light source comprises a plurality of substantially parallel thick control electrodes and thin control electrodes, said thick control electrodes alternating with said thin control electrodes (11a, 11b; 11a', 11a", 11b', 11b"), wherein said thick and thin control electrodes are independently controllable.

7. A display device according to claim 6, wherein said electrodes (11a', 11a", 11b', 11b") are arranged in a two-dimensional grid having a plurality of rows and columns.

8. A display device according to claim 4, wherein the pixels (15) of the liquid crystal display (5) are arranged in rows and columns.

9. A display device according to claim 1, wherein the light source (6) comprises a two-dimensional array of independently controllable light emitting regions (12R, 12G, 12B) and a control circuit (16) configured for controlling said regions (12R, 12G, 12B) in dependence on data representing an image to be displayed.

10. A display device according to claim 9, wherein said regions (12R, 12G, 12B) emit different coloured light.

11. A display device according to claim 10, wherein said regions form a repeating pattern of red, green and blue emitters (12R, 12G, 12B).

12. A display device according to claim 9, wherein the control circuit (16) is configured for controlling the intensity of the light emitted by said regions (12R, 12G, 12B) in dependence on data representing the local brightness of the image to be displayed.

13. A display device according to claim 1, wherein the length of each of said strings is substantially the same as the spacing between its illuminating narrow source and a neighbouring narrow source thereof.

14. A display device according to claim 1, including a control circuit (16), wherein the control circuit is configured for energising a first set ($11b_{1...6}$) of said control electrodes ($11b_{1...6}$, $11b'_{1...6}$) to produce a first image and subsequently energising a second set ($11b'_{1...6}$) of said control electrodes ($11b_{1...6}$, $11b'_{1...6}$) to produce a second image.

15. An electronic apparatus including a display device comprising:
   a light source (6) comprising thin, substantially parallel, independently controllable control electrodes, wherein the light source (6) is configured for operation as a single broad light source or a plurality of narrow light sources, spaced in a spacing direction; and
   an array (5) of light intensity modulators (15) for modulating light from the light source (6), wherein the light source (6) and the array (5) of light intensity modulators are arranged such that each modulator (15) is significantly illuminated by only one of said narrow sources; and a string of said modulators (15), which are parallel to said spacing direction, are illuminated by a corresponding one of said narrow light sources, wherein said control electrodes are skewed relative to a corresponding one of said string of said light intensity modulators such that said control electrodes extend under a plurality of said light intensity modulators.

* * * * *